3,769,389
ANHYDROUS HYDRAZINIUM DIPERCHLORATE PREPARATION
John E. Paustian, Whippany, N.J., assignor to Thiokol Chemical Corporation, Bristol, Pa.
No Drawing. Filed Aug. 30, 1965, Ser. No. 483,849
Int. Cl. C01b 7/00, 21/52
U.S. Cl. 423—386
17 Claims

ABSTRACT OF THE DISCLOSURE

The invention relates to a process of preparing anhydrous hydrazinium diperchlorate by reacting hydrazinium monohydrochloride or dihydrochloride, carbazic acid or hydrozinum carbazate with excess concentrated perchloric acid. Anhydrous hydrazinium diperchlorate is useful as an oxidizer in solid propellant compositions.

---

This invention concerns a novel process for preparing anhydrous hydrazinium diperchlorate substantially free from thermal decomposition contaminants.

More particularly, this process relates to a process for preparing hydrazinium diperchlorate without the need for an exothermic neutralization step and without the need for a thermal decomposition step.

Anhydrous hydrazinium diperchlorate ($HP_2$) is an exceedingly energetic and useful oxidizer. In addition to its exceptional potency, it has ancillary advantages which would make it desirable as an oxidizer in solid propellant compositions. These advantages include high density, a high burning rate and relatively low sensitivity toward detonation from shock.

Hydrazinium diperchlorate is usually prepared by the neutralization of hydrazine or its aqueous solutions with perchloric acid. Since the reaction is essentially a neutralization reaction between a strong acid and a strong base, it is highly exothermic and requires considerable cooling of the reaction mixture to safely prepare the final product. This is particularly true when the free hydrazine base is neutralized with concentrated perchloric acid. Even though the reaction mixture is cooled during the neutralization, substantial amounts of thermal decomposition products are produced which contaminate the final product. Since these impurities are nonvolatile, they must be removed via extraction or by recrystallization or some other tedious and costly process. All of these additional steps add to the final cost of the product and, in many instances, reduced yields significantly. Where $HP_2$ is to be used as a propellant oxidizer, exceedingly close control of these decomposition products is necessary. The reason for this is that many of these decomposition materials exhibit thermal and/or vibrational instability or, if inert, reduced the energy of the product by dilution.

Two methods have been used to reduce the amount of decomposition products produced during the reaction. One method is to dilute the perchloric acid and/or hydrazine reactant with water, the second method is to dilute with an appropriate inert solvent.

The former procedure does reduce the exothermic nature of the reaction and therefore reduces the amount of exothermically product contaminants. However, the product that is produced is in the form of the hydrate. Since the anhydrous form is required, costly, time consuming and extremely touchy drying steps are required to produce the anhydrous crystals. Dilution of the reactants is also disadvantageous in that it increases the volume of the reaction mixtures and increases the time of the process cycle. The processes utilizing a nonaqueous environment are troublesome in that the choice of solvent is limited to those having the appropriate selective solubility toward $HP_2$ and the metallic salt by-products, the high cost of suitable nonaqueous solvents and the fact that the product must be separated from a nonvolatile by-product.

In view of the enumerated disadvantages of the processes of the prior art, an improved process for preparing hydrazinium diperchlorate in good yield in its anhydrous form is highly desirable. Ideally, the improved process would operate at substantially room temperature and would utilized readily available starting materials and would not require the use of water or wet solvents yet would not be strongly exothermic or produce a product contaminated with decomposition products. In addition, any by-products produced during the reaction would be volatile and could be remove from the reaction mixture during the course of the reaction thus avoiding a subsequent separation problem.

Therefore, it is an object of this invention, among others, to prepare hydrazinium diperchlorate in the anhydrous state substantially free from unstable contaminents.

It is another object of this invention to prepare hydrazinum diperchlorate as described above without solvent dilution, by a nonexothermic reaction.

A further object of this invention is the preparation of anhydrous hydrazinium diperchlorate without the need of a thermal dehydration step.

Additional objects of this invention are the development of an $HP_2$ process in which all the by-products are volatilized prior to the preparation of final products; the readily available reactants are utilized and the product is obtained in good yield.

The above objects, among others, are achieved by the process described more fully below:

In practice, concentrated perchloric acid is contacted with undiluted solid hydrazine mono or disalts until the reaction mixture contains anhydrous diperchlorate product. The anhydrous $HP_2$ product is separated from the reaction mixture using the usual separation and purification procedures such as vacuum distillation, recrystallization, solvent extraction, centrifugation and the like.

In the preferred practice, concentrated perchloic acid of about 72% by weight or higher is contacted at near room temperature with solid hydrazinium mono or disalt which, upon said treatment, liberates a volatile form of the salt or its decomposition products. The reaction mixture is preferably pumped under a strong vacuum or purged with an inert gas such as nitrogen, to remove the volatile by-products and cooled to increase the precipitation of the hydrazinium diperchlorate final product. The precipitated product is removed using filtration, centrifugation or any of the usual separation methods used to separate solids from mother liquors. Again, further purification can be effected using the procedures of the prior art.

As the above description indicates, the inventive process is somewhat flexible insofar as reaction conditions and reactants are concerned. The salient permissible modifications and variations are set forth below:

Temperature.—While the preferred temperature range is about room temperature, about 20–30° C., higher or lower temperatures can be used if desired. The operable temperature range is about −10 to about 50° C. at atmospheric pressures. Higher temperatures introduce thermal decomposition contaminants into the final product.

Pressures.—Routinely, the reaction is conducted at atmospheric or near atmospheric pressures. However, to facilitate the removal of the volatile by-products of the process, subatmospheric pressures, usually about 1 mm. of mercury or less, are used shortly after or concurrent with the admixing of the hydrazine salt and the perchloric acid reactants. While superatmospheric pressures can be used if desired, their use is contraindicated since they repress the desired removal of the volatile by-products of the reaction. Further, the use of supernatmospheric pressures requires costly specialized equipment and increases safety hazards unnecessarily.

Reaction time.—Ordinarily, the reaction is substantially complete within ½ to 4 hours of the mixing of two reactants, where the preferred hydrazinium salts such as the hydrazine mono or dihydrochloride or carbazate are used as reactants. Longer reaction times are not harmful and, in some instances, where the by-products are less volatile, are desirable. Appreciably shorter reaction times are contingent upon the use of hydrazine salts of volatile, insoluble acids such as carbon dioxide.

Ratio of reactants.—To avoid obtaining a mixture of hydrazinium monoperchlorate and hydrazinium diperchlorate and hydrazinium diperchlorate products, an excess of perchloric acid over that required by stoichiometry must be used. The extent of the excess is limited largely by economics since very large excesses (5 times stoichiometric ratios or higher) are not harmful. Good results have been obtained where the perchloric acid concentration is 2 to 20 times more than required by stoichiometry.

Reactants.—The term "excess perchloric" acid as used herein refers to that quantity of acid above that required by stochiometry to produce the diperchlorate salt. The term "concentrated perchloric" acid as used herein refers to pechloric acid having a concentration of about 50% by weight or higher. Lower concentrations while operable require heating the reaction mixture to remove the substituted groups, displaced by the perchloric acid. The reason for this is lower concentrations of perchloric acid add unnecessary water to the system. Preferably perchloric acid of no less than 72% by weight concentration is used. This concentration when used in stoichiometric excess results in the formation of anhydrous hydrazinium diperchlorate in a mother liquor of perchloric acid where concentration is about 69% by weight or higher. This mother liquor concentration has been found to be the minimum concentration for the preparation of the anhydrous hydrazinium diperchlorate in optimum yield. The use of more dilute concentrations, e.g. 50% by weight or higher is feasible if at least about 1.5 times the amount of perchloric acid required by stoichiometry is used. Unless this large an excess or more of the more dilute acid is used, the $HP_2$ will precipitate as the dihydrate and an additional dehydration step is required to produce the anhydrous product.

The term "solid hydrazinium reactant" as used herein refers to those hydrazinium salts of voltile acids weaker than (and thus displaceable by) perchloric acid.

The preferred solid hydrazinium reactants are those in which the displaceable groups are volatilized at reaction temperatures. Illustrative solid hydrazinium reactants are: hydrazinium monohydrochloride, hydrazinium dihydrochloride, carbazic acid, and hydrazinium carbazate.

The hydrochloride and carbazate salts are preferred because in the former case gaseous HCl is displaced and in the latter case gaseous $CO_2$ is displaced. All of the hydrazine reactants of this invention are known products and can be either purchased or synthesized. In the latter case the synthetic methods are described in the chemical literature. Concentrated perchloric acid is a commercial product.

To set forth the invention in the greatest possible details the following illustrative embodiment are submitted.

In one embodiment of this invention concentrated perchloric acid (72% by weight, 91.0 g.) and 2.28 g. of hydrazinium hydrochloride are admixed in a reaction vessel fitted with stirring, heating, and evacuating means. A continuous evolution of HCl gas is observed immediately upon mixing but no exothermic reaction takes place. Shortly thereafter the vacuum source is turned on and the stirring continued for 24 hours at a pressure of 1 mm./Hg. At the end of this time the stirring and vacuum is discontinued and the reaction mixture filtered to obtain solid anhydrous hydrazinium diperchlorate (4.82) wet with mother liquid. After drying under vacuum for 24 hours, an anhydrous product is obtained. This product when evaluated in a propellant composition functioned well and had good thermal and vibrational stability.

In another embodiment of this invention 10 g. of crystalline hydrazinium dihydrochloride is mixed with 250 g. of 72% by weight perchloric acid in a reaction vessel equipped as supra. After the stream of HCl had substantially ceased the system is evacuated to 1 mm./Hg and the stirring continued for 4 hours. At the end of this time the precipitated anhydrous hydrazinium diperchlorate is filtered off and dried under vacuum. Again a propellant grade product having good thermal and vibrational stability is obtained.

In a substantial rerun of the above embodiment 5 parts by weight of hydrazinium dihydrochloride is contacted with stirring with 500 parts by weight of 72% by weight $HClO_4$. After evolution of HCl has diminished, nitrogen gas is passed into the reaction mixture at about 10 mm./Hg to act as a purge for residual HCl. After 12 hours the nitrogen purge is discontinued and the reaction mixture filtered off. A filter cake of anhydrous hydrazinium diperchlorate is obtained.

In a further embodiment 5 parts by weight of carbazic acid, $NH_2NHCOOH$, is reacted with 200 parts by weight of 72% perchloric acid under 1 mm./Hg until $CO_2$ evolution ceases. After ½ additional hour of stirring under these conditions the reaction mixture is cooled to $-10°$ C. and the anhydrous $HP_2$ product filtered off. No discernable difference in the product over previous products is obtained.

In yet an additional process embodiment, using the reaction conditions and procedure described above the run is repeated using hydrazinium carbazate, $$NH_2NHCOON_2H_5$$

substituted on a molar basis for carbazic acid the same quantity of concentrated perchloric acid is used. Again the substantially same $HP_2$ product is obtained.

As indicated previously the inventive process is advantageous in several respects including availability of reactants relatively flexible reaction conditions and the fact that the reaction by-products are volatilized during the reaction. In addition the hydrazinium diperchlorate product is obtained in a high state of purity in its anhydrous form.

To best demonstrate the metes and bounds of this invention the following claims are submitted.

What is claimed is:

1. A process for preparing anhydrous hydrazinium diperchlorate comprising contacting a solid hydrazinium reactant selected from the group consisting of hydrazinium monohydrochloride, hydrazinium dihydrochloride, carbazic acid, and hydrazinium carbazate, with excess concentrated perchloric acid until anhydrous hydrazinium diperchlorate is formed, and isolating the hydrazinium diperchlorate formed therein.

2. A process for preparing anhydrous hydrazinium diperchlorate comprising contacting a solid hydrazinium reactant selected from the group consisting of hydrazinium monohydrachloride, hydrazinium dihydrochloride, carbazic acid and hydrazinium carbazate, with excess concentrated perchloric acid of at least 50% by weight concentration, until anhydrous hydrazinium diperchlorate is formed, and isolating the hydrazinium diperchlorate formed therein.

3. The process of claim 2 wherein the reaction mixture is exposed to subatmospheric pressure prior to isolating the hydrazinium diperchlorate formed therein.

4. The process of claim 2 wherein an inert gas is passed into said admixture of solid hydrazinium reactant and concentrated perchloric prior to isolating the hydrazinium diperchlorate product.

5. A process for preparing anhydrous hydrazinium diperchlorate comprising contacting a solid hydrazinium reactant selected from the group consisting of hydrazinium monohydrochloride, hydrazinium dihydrochloride, carbazic acid, and hydrazinium carbazate, with excess concentrated perchloric acid of at least about 72% by weight concentration, until gaseous evolution is substantially complete, and a reaction mixture including anhydrous hydrazinium diperchlorate, residual gas and perchloric acid mother liquor is formed, passing an inert gas into said reaction mixture until said residual gas is displaced, and isolating the anhydrous hydrazinium diperchlorate formed therein.

6. The process of claim 5, wherein the reaction is conducted at subatmospheric pressures.

7. The process of claim 6, wherein the mother liquor is cooled below about room temperature before isolation of the anhydrous diperchlorate.

8. The process of claim 5, wherein the solid hydrazinium reactant is hydrazinium monohydrochloride.

9. The process of claim 5, wherein the solid hydrazinium reactant is hydrazinium dihydrochloride.

10. The process of claim 5, wherein the solid hydrazinium reactant is carbazic acid.

11. The process of claim 5, wherein the solid hydrazinium reactant is hydrazinium carbazate.

12. A continuous process for preparing anhydrous hydrazinium diperchlorate comprising continuously admixing a solid hydrazinium reactant selected from the group consisting of hydrazinium monohydrochloride, hydrazinium dihydrochloride, carbazic acid, and hydrazinium carbazate with excess perchloric acid of at least 72% by weight concentration until gaseous evolution is substantially complete, and a reaction mixture including a mother liquor of no less than 69% by weight of perchloric acid, anhydrous hydrazinium diperchlorate and residual gas is formed, isolating the anhydrous hydrazinium diperchlorate formed from the concentrated perchloric acid mother liquor and continuously replenishing the solid hydrazinium and concentrated perchloric acid reactants exhausted in the process.

13. The process of claim 12, wherein the solid hydrazinium reactant is hydrazinium monohydrochloride.

14. The process of claim 12, wherein the hydrazinium dihydrochloride is hydrazinium monohydrochloride.

15. A process for preparing anhydrous hydrazinium diperchlorate comprising contacting a solid hydrazinium reactant selected from the group consisting of hydrazinium monohydrochloride, hydrazinium dihydrochloride, carbazic acid, and hydrazinium carbazate with at least about a 1.5 excess of concentrated perchloric acid having a concentration of no less than about 50% by weight, until gaseous evolution is substantially complete, and a reaction mixture including concentrated perchloric acid, residual gas and anhydrous hydrazinium diperchlorate is formed, passing an inert gas into said reaction mixture to displace residual gas and isolating the anhydrous hydrazinium diperchlorate formed therein.

16. The process of claim 15, wherein the solid hydrazinium reactant is hydrazinium monohydrochloride.

17. The process of claim 15, wherein the hydrazinium reactant is hydrazinium monohydrochloride.

References Cited

UNITED STATES PATENTS

| | | | |
|---|---|---|---|
| 3,131,997 | 5/1964 | Stern | 149—36 X |
| 3,259,657 | 7/1966 | Stammier | 149—36 X |

OTHER REFERENCES

Emeleus et al., Advances in Inorganic Chemistry, vol. 8, 1966, Academic Press, New York, pp. 198, 199, 219 and 221, QD1 A35.

Schumacher, Perchlorates, Their Properties, Manufacture and Uses, pp. 59 and 70, ACS monograph No. 146 (1960), Reinhold Pub. Corp., New York.

LELAND A. SEBASTIAN, Primary Examiner

U.S. Cl. X.R.

149—36